US011058113B1

(12) United States Patent
Smith et al.

(10) Patent No.: US 11,058,113 B1
(45) Date of Patent: Jul. 13, 2021

(54) FLY AND PUPA INSECTICIDE

(71) Applicant: Fly's Water, LLC, Jacksonville, AR (US)

(72) Inventors: Mark Smith, Jacksonville, AR (US); Anthony Vertino, Sherwood, AR (US)

(73) Assignee: Fly's Water, LLC, Jacksonville, AR (US)

( * ) Notice: Subject to any disclaimer, the term of this patent is extended or adjusted under 35 U.S.C. 154(b) by 0 days.

(21) Appl. No.: 16/600,556

(22) Filed: Oct. 13, 2019

Related U.S. Application Data

(60) Provisional application No. 62/745,355, filed on Oct. 13, 2018.

(51) Int. Cl.

| | |
|---|---|
| ***A61K 36/235*** | (2006.01) |
| ***A01N 37/36*** | (2006.01) |
| ***A01N 31/02*** | (2006.01) |
| ***A01N 65/10*** | (2009.01) |

(52) U.S. Cl.
CPC ............ *A01N 37/36* (2013.01); *A01N 31/02* (2013.01); *A01N 65/10* (2013.01)

(58) Field of Classification Search
None
See application file for complete search history.

(56) References Cited

U.S. PATENT DOCUMENTS

| | | | | |
|---|---|---|---|---|
| 6,103,763 | A | 8/2000 | Horst | |
| 6,548,085 | B1 | 4/2003 | Zobitne et al. | |
| 8,394,358 | B2 | 3/2013 | Schneidmiller et al. | |
| 8,968,757 | B2 | 3/2015 | Man et al. | |
| 2007/0092544 | A1 * | 4/2007 | Mills | A01N 65/00 424/405 |

OTHER PUBLICATIONS

Digilio et al. (2008) Journal of Plant Interactions, 3:1, 17-23. (Year: 2008).*
Marcus et al. (1979) J. Agric. Food Chem. vol. 27, No. 6, 1217-1223. (Year: 1979).*
Park et al. (2006) Pest Manag Sci 62: 723-728. (Year: 2006).*
Shojaii et al. (2012) ISRN Pharmaceutics, vol. 2012, Article ID 510795, 8 pages (Year: 2012).*

* cited by examiner

*Primary Examiner* — Russell G Fiebig
(74) *Attorney, Agent, or Firm* — Rashauna Norment

(57) ABSTRACT

A sprayable insecticidal and pupicidal composition (solution) for immobilizing and killing adult houseflies and pupa while being nonabrasive, nontoxic, and ingestible for humans and human contact. Effective amounts of dioctyl sodium sulfosuccinate is an active ingredient in the solution. The solution may further include effective amounts of glycerin as an active ingredient in the solution. The solution may further include a scented fragrance, namely, anise, for providing an aromatic characteristic to the solution.

4 Claims, 33 Drawing Sheets

9/14/19
75°
8:01 pm

FLYSWATER Dilution Experimentation

Docusate – 50% Dilution

Needle Inoculum

| Docusate – 50% Dilution | Dihydrogen Monoxide Control |
|---|---|
| 10 / 10 deaths | 0 / 10 deaths |
| 56 seconds | |

Spray Inoculum

| Docusate – 50% Dilution | Dihydrogen Monoxide Control |
|---|---|
| 10 / 10 deaths | 0 / 10 deaths |
| 43 seconds | |

FLYSWATER Dilution Experimentation

Docusate – 75% Dilution

Needle Inoculum

| Docusate – 75% Dilution | Dihydrogen Monoxide Control |
|---|---|
| 10 / 10 deaths | 0 / 10 deaths |
| 124 seconds | |

Spray Inoculum

| Docusate – 75% Dilution | Dihydrogen Monoxide Control |
|---|---|
| 89 seconds | |
| 10 / 10 deaths | 0 / 10 deaths |

FLYSWATER Dilution Experimentation

Docusate – 90% Dilution

<u>Needle Inoculum</u>

Docusate – 90% Dilution        Dihydrogen Monoxide Control

*10* / 10 deaths             *0* / 10 deaths

*121 seconds*

<u>Spray Inoculum</u>

Docusate – 90% Dilution        Dihydrogen Monoxide Control

*10* / 10 deaths             *0* / 10 deaths

*143 seconds*

FLYSWATER Dilution Experimentation

Docusate – 95% Dilution

<u>Needle Inoculum</u>

Docusate – 95% Dilution          Dihydrogen Monoxide Control

_10_ / 10 deaths                 _0_ / 10 deaths 4 min 58 seconds
298 seconds

<u>Spray Inoculum</u>

Docusate – 95% Dilution          Dihydrogen Monoxide Control

_10_ / 10 deaths                 _0_ / 10 deaths 5 min 11 seconds
311 seconds

Fig. 4

FLYSWATER Dilution Experimentation

9/19/19
75°
9:47 p—

Docusate – 99% Dilution

Needle Inoculum

Docusate – 99% Dilution          Dihydrogen Monoxide Control

_10_ / 10 deaths                 _1_ / 10 deaths 6 min 46 seconds
406 seconds

Spray Inoculum

Docusate – 99% Dilution          Dihydrogen Monoxide Control

_10_ / 10 deaths                 _0_ / 10 deaths 5 min 37 seconds
337 seconds

FLYSWATER Dilution Experimentation

Docusate – No Dilution

Needle Inoculum

Docusate – No Dilution          Dihydrogen Monoxide Control

_10_ / 10 deaths                    _0_ / 10 deaths

*48 seconds*

Spray Inoculum

Docusate – No Dilution          Dihydrogen Monoxide Control

_10_ / 10 deaths                    _0_ / 10 deaths

*68 seconds*

FLYSWATER Dilution Experimentation

Glycerin – 50% Dilution

<u>Needle Inoculum</u>

| Glycerin – 50% Dilution | Dihydrogen Monoxide Control |
|---|---|
| 5 / 10 deaths | 1 / 10 deaths |

30 minutes
→ incapable of flying

<u>Spray Inoculum</u>

| Glycerin – 50% Dilution | Dihydrogen Monoxide Control |
|---|---|
| 6 / 10 deaths | 2 / 10 deaths |

30 minutes
→ incapable of flying

Fig. 7

FLYSWATER Dilution Experimentation

Glycerin – 75% Dilution

*[handwritten: 8/05/09, 75°, 7:24pm]*

Needle Inoculum

Glycerin – 75% Dilution        Dihydrogen Monoxide Control

_4_ / 10 deaths             _1_ / 10 deaths

*[handwritten: 30 minutes → capable of flight]*

Spray Inoculum

Glycerin – 75% Dilution        Dihydrogen Monoxide Control

_6_ / 10 deaths             _0_ / 10 deaths

*[handwritten: 30 minutes → incapable of flight]*

FLYSWATER Dilution Experimentation

Glycerin – 90% Dilution

<u>Needle Inoculum</u>

Glycerin – 90% Dilution         Dihydrogen Monoxide Control

*2* / 10 deaths                  *1* / 10 deaths

*30 minutes → capable of flying*

<u>Spray Inoculum</u>

Glycerin – 90% Dilution         Dihydrogen Monoxide Control

*7* / 10 deaths                  *1* / 10 deaths

*30 minutes → incapable of flying*

Fig. 9

FLYSWATER Dilution Experimentation

9/15/15
75°
5:53 pm

Glycerin – No Dilution

Needle Inoculum

Glycerin – No Dilution         Dihydrogen Monoxide Control

_0_ / 10 deaths                _0_ / 10 deaths 30 minutes
→ incapable of flight

Spray Inoculum

Glycerin – No Dilution         Dihydrogen Monoxide Control

_0_ / 10 deaths                _0_ / 10 deaths 30 minutes
→ incapable of flight

FLYSWATER Dilution Experimentation

Anise – 50% Dilution

Needle Inoculum

Anise – 50% Dilution Dihydrogen Monoxide Control

10 / 10 deaths 0 / 10 deaths 22 min 52 seconds

Spray Inoculum

Anise – 50% Dilution Dihydrogen Monoxide Control

10 / 10 deaths 0 / 10 deaths 9 min 6 seconds

FLYSWATER Dilution Experimentation

Anise – 75% Dilution

Needle Inoculum

Anise – 75% Dilution          Dihydrogen Monoxide Control

_10_ / 10 deaths              _0_ / 10 deaths 28 min 33 seconds

Spray Inoculum

Anise – 75% Dilution          Dihydrogen Monoxide Control

_10_ / 10 deaths              _0_ / 10 deaths 11 min 3 seconds

Fig. 12

FLYSWATER Dilution Experimentation

7/16/19
75°
9:53 pm

Anise – 90% Dilution

Needle Inoculum

Anise – 90% Dilution          Dihydrogen Monoxide Control

2 / 10 deaths                 0 / 10 deaths
30 minutes
incapable of flight

Spray Inoculum

Anise – 90% Dilution          Dihydrogen Monoxide Control

5 / 10 deaths                 1 / 10 deaths
30 minutes
incapable of flight

FLYSWATER Dilution Experimentation

Anise – No Dilution

Needle Inoculum

Anise – No Dilution          Dihydrogen Monoxide Control

_10_ / 10 deaths              _0_ / 10 deaths 4 min 11 seconds

Spray Inoculum

Anise – No Dilution          Dihydrogen Monoxide Control

_10_ / 10 deaths              _0_ / 10 deaths 3 min 32 seconds

FLYSWATER Dilution Experimentation

Saline 0.9%

Needle Inoculum

Saline 0.9% Dihydrogen Monoxide Control

0 / 10 deaths 1 / 10 deaths 30 minutes
→ capable of flying

Spray Inoculum

Saline 0.9% Dihydrogen Monoxide Control

1 / 10 deaths 1 / 10 deaths 30 minutes
→ capable of flying

FLYSWATER Dilution Experimentation

Saline 3%

Needle Inoculum

Saline 3%          Dihydrogen Monoxide Control

_0_ / 10 deaths       _0_ / 10 deaths 30 minutes
→ capable of flight

Spray Inoculum

Saline 3% Dihydrogen Monoxide Control

0 / 10 deaths 0 / 10 deaths 30 minutes
→ capable of flight

Fig. 16

FLYSWATER Dilution Experimentation

9/17/19
75°
9:51 pm

Saline 20%

Needle Inoculum

Saline 20%           Dihydrogen Monoxide Control

_0_ / 10 deaths      _0_ / 10 deaths 30 minutes
→ capable of flight

Spray Inoculum

Saline 20%           Dihydrogen Monoxide Control

_0_ / 10 deaths      _0_ / 10 deaths 30 minutes
→ capable of flight

Fig. 17

FLYSWATER Dilution Experimentation

9/17/15
25°
9=19 pm

Saline 37.5%

Needle Inoculum

Saline 37.5%              Dihydrogen Monoxide Control

_0_ / 10 deaths           _0_ / 10 deaths 30 minutes
→ capable of flight

Spray Inoculum

Saline 37.5%              Dihydrogen Monoxide Control

_0_ / 10 deaths           _0_ / 10 deaths 30 minutes
→ capable of flight

Fig. 18

FLYSWATER Formula Experimentation

Larvae

Spray Inoculum

*9/25/2015*
*75°*
*1f=1t pm*

Docusate (10.0 ml) + Glycerin (10.0 ml) + Anise (2.5 ml) + Dihydrogen Monoxide (77.5 ml)

*0* / 10 deaths      *0* / 10 deaths

*30 minutes*

Tween 80 (10.0 ml) + Glycerin (10.0 ml) + Anise (2.5 ml) + Dihydrogen Monoxide (77.5 ml)

*0* / 10 deaths      *0* / 10 deaths

*30 minutes*

Dihydrogen Monoxide (100.0 ml)

*0* / 10 deaths      *0* / 10 deaths

*30 minutes*

FLYSWATER Formula Experimentation

Pupa

Spray Inoculum

10/1/19
75°
17:45 pm

Docusate (10.0 ml) + Glycerin (10.0 ml) + Anise (2.5 ml) + Dihydrogen Monoxide (77.5 ml)

10 / 10 deaths

49 / 50 deaths
5 Flies – Dead
1 Fly – Alive

Tween 80 (10.0 ml) + Glycerin (10.0 ml) + Anise (2.5 ml) + Dihydrogen Monoxide (77.5 ml)

10 / 10 deaths
3 Flies – Dead

50 / 50 deaths
10 Flies – Dead

Dihydrogen Monoxide (100.0 ml)

3 / 10 deaths
7 Flies – Live

4 / 50 deaths
46 Flies – Live

Fig. 20

FLYSWATER Formula Experimentation

Fly

Spray Inoculum

*10/2/18*
*75°*
*9-52 pm*

Docusate (10.0 ml) + Glycerin (10.0 ml) + Anise (2.5 ml) + Dihydrogen Monoxide (77.5 ml)

*10*/ 10 deaths

*64 seconds*

Tween 80 (10.0 ml) + Glycerin (10.0 ml) + Anise (2.5 ml) + Dihydrogen Monoxide (77.5 ml)

*10* / 10 deaths

*273 seconds*

Dihydrogen Monoxide (100.00 ml)

*0* / 10 deaths

FLYSWATER Dilution Experimentation

Tween 80 – 50% Dilution

Needle Inoculum

| Tween 80 – 50% Dilution | Dihydrogen Monoxide Control |
|---|---|
| 10 / 10 deaths | 1 / 10 deaths |
| 10 min 22 second | |

Spray Inoculum

| Tween 80 – 50% Dilution | Dihydrogen Monoxide Control |
|---|---|
| 10 / 10 deaths | 0 / 10 deaths |
| 7 min 35 seconds | |

FLYSWATER Dilution Experimentation

Tween 80 – 75% Dilution

Needle Inoculum

Tween 80 – 75% Dilution         Dihydrogen Monoxide Control

_10_/ 10 deaths                 _0_ / 10 deaths 12 min 59 seconds

Spray Inoculum

Tween 80 – 75% Dilution         Dihydrogen Monoxide Control

_10_/ 10 deaths                 _0_ / 10 deaths 6 min 47 seconds

Fig. 23

FLYSWATER Dilution Experimentation

9/16/15
75°
3:05 pm

Tween 80 – 90% Dilution

Needle Inoculum

Tween 80 – 90% Dilution        Dihydrogen Monoxide Control

_5_ / 10 deaths             _1_ / 10 deaths 30 minutes capable of flight

Spray Inoculum

Tween 80 – 90% Dilution        Dihydrogen Monoxide Control

_10_/ 10 deaths            _1_ / 10 deaths

1min 34 seconds

Fig. 24

FLYSWATER Dilution Experimentation

9/05/19
75°
9:45 pm

Tween 80 – No Dilution

Needle Inoculum

Tween 80 – No Dilution        Dihydrogen Monoxide Control

10 / 10 deaths               0 / 10 deaths 3 min 5 seconds

Spray Inoculum

Tween 80 – No Dilution        Dihydrogen Monoxide Control

10 / 10 deaths               0 / 10 deaths 3 min 35 seconds

Fig. 25

FLYSWATER Dilution Experimentation

9/16/18
9:00
11:46 pm

Ethyl Alcohol – 50% Dilution

<u>Needle Inoculum</u>

Ethyl Alcohol – 50% Dilution          Dihydrogen Monoxide Control

_10_ / 10 deaths                       _0_ / 10 deaths 18 min 19 seconds

<u>Spray Inoculum</u>

Ethyl Alcohol – 50% Dilution          Dihydrogen Monoxide Control

_10_ / 10 deaths                       _0_ / 10 deaths 14 min 44 seconds

Fig. 26

FLYSWATER Dilution Experimentation

*8/17/09*
*75°*
*8:06 pm*

Ethyl Alcohol – 75% Dilution

Needle Inoculum

Ethyl Alcohol – 75% Dilution      Dihydrogen Monoxide Control

__1__ / 10 deaths      __0__ / 10 deaths

*30 minutes incapable of flight*

Spray Inoculum

Ethyl Alcohol – 75% Dilution      Dihydrogen Monoxide Control

__4__ / 10 deaths      __0__ / 10 deaths

*30 minutes → incapable of flight*

FLYSWATER Dilution Experimentation

Ethyl Alcohol – 90% Dilution

<u>Needle Inoculum</u>

Ethyl Alcohol – 90% Dilution          Dihydrogen Monoxide Control

_0_ / 10 deaths                    _0_ / 10 deaths

*30 minutes*
*capable of flight*

<u>Spray Inoculum</u>

Ethyl Alcohol – 90% Dilution          Dihydrogen Monoxide Control

_1_ / 10 deaths                    _0_ / 10 deaths

*30 minutes*
*capable of flight*

Fig. 28

FLYSWATER Dilution Experimentation

Ethyl Alcohol – No Dilution

8/16/19
75°
11:22 pm

Needle Inoculum

Ethyl Alcohol – No Dilution          Dihydrogen Monoxide Control

_10_ / 10 deaths                     _0_ / 10 deaths
3 min 53 seconds

Spray Inoculum

Ethyl Alcohol – No Dilution          Dihydrogen Monoxide Control

_10_ / 10 deaths                     _0_ / 10 deaths 3 min 11 seconds

Fig. 29

FLYSWATER Formula Experimentation

Fly

Spray Inoculum – Dioctyl Sodium Sulfosuccinate (10mg/ml)

*10/10/15*
*75°*
*9:54 pm*

Dioctyl Sodium Sulfosuccinate – No Dilution

*10* / 10 deaths

*36 seconds*

Dioctyl Sodium Sulfosuccinate – 50% Dilution

*10* / 10 deaths

*46 seconds*

Dioctyl Sodium Sulfosuccinate – 90% Dilution

*10*/ 10 deaths

*188 seconds*

Dihydrogen Monoxide

*0* / 10 deaths

FLYSWATER Formula Experimentation

Fly

Spray Inoculum

Docusate (25.0 ml) + Tween 80 (25.0 ml) + Glycerin (10.0 ml) + Dihydrogen Monoxide (40.0 ml)

10 / 10 deaths 351 seconds

Docusate (30.0 ml) + Tween 80 (10.0 ml) + Glycerin (10.0 ml) + Dihydrogen Monoxide (40.0 ml)

10 / 10 deaths 273 seconds

Dihydrogen Monoxide (100.00 ml)

0 / 10 deaths

FLYSWATER Formula Experimentation

Fly

Spray Inoculum

Docusate (30.0 ml) + Tween 80 (1.0 ml) + Glycerin (20.0 ml) + Dihydrogen Monoxide (49.0 ml)

*10* / 10 deaths

*192 seconds*

Docusate (35.0 ml) + Tween 80 (5.0 ml) + Glycerin (15.0 ml) + Dihydrogen Monoxide (45.0 ml)

*10* / 10 deaths

*559 seconds*

Dihydrogen Monoxide (100.00 ml)

*0* / 10 deaths

Fig. 32

FLYSWATER Formula Experimentation

Fly

Spray Inoculum

*10/10/15*
*75°*
*7:34 pm*

Docusate (50.0 ml) + Glycerin (10.0 ml) + Dihydrogen Monoxide (40.0 ml)

*10* / 10 deaths

*109 seconds*

Docusate (50.0 ml) + Tween 80 (5.0 ml) + Glycerin (10.0 ml) + Dihydrogen Monoxide (35.0 ml)

*10* / 10 deaths

*47 seconds*

Dihydrogen Monoxide (100.00 ml)

*0* / 10 deaths

Fig. 33

FLY AND PUPA INSECTICIDE

CROSS-REFERENCE TO RELATED APPLICATIONS

This utility patent application claims the benefit of and priority to U.S. Provisional Patent Application No. 62/745,355, filed on Oct. 13, 2018, and is incorporated herein by reference.

FEDERALLY SPONSORED RESEARCH AND DEVELOPMENT

Not applicable.

BACKGROUND OF THE INVENTION

1. Field of the Invention

The invention generally relates to an insecticide for use as an adulticide and a pupicide against *Musca domestica* Linnaeus houseflies and *Musca domestica* Linnaeus pupa, with the insecticide being nontoxic and ingestible for humans by using dioctyl sodium sulfosuccinate as an active ingredient of the insecticide.

2. Description of Arguably Related Art Including Information Disclosed for 37 CFR 1.97 and 1.98

Insects and other pests including, but not limited to, *Musca domestica* Linnaeus houseflies, both in adult stage and in pupa stage, are a nuisance around the home, the office, and during outdoor activities. When flies are attracted to a surface, namely, food, water, or countertops, the flies can contaminate the surface and can pose health risks to compromised humans and animals. Some methods for killing a fly include tracking down the fly and trying to kill it with an apparatus commonly called a fly swatter. Other methods for killing a fly include spraying the fly's flight path and its anticipated landing spot with some kind of insecticide made from chemicals that may be harmful to humans. It can be a daunting task to track down an airborne fly or a temporarily landed fly, then using the fly swatter or insecticidal spray with precision to kill the fly. Problems remain for each of these methods of killing flies.

Fly residue present on at least its feet or carcass can lead to surface contamination that must be properly cleaned. When harsh chemicals are used, the user is often unable to contain the trajectory of the sprayable composition. The known surfaces which came into contact with the harsh chemicals must be thoroughly cleaned and any food that was inadvertently sprayed with the harsh chemicals must be discarded.

Pesticide and insecticide elimination tools include other types of spray solutions. These spray solutions are not preferred because the potentially toxic components within those sprays may be inadvertently inhaled, digested, or touched by humans. References to "harsh chemicals" or "toxic components" herein refer to chemicals that are either toxic or not ingestible for humans. References to "non-toxic, nontoxic" "toxic," and "ingestible" refers to the effect applied to humans, not the insects. Some non-toxic pesticides and insecticides are available, but these often lack the potency, consistency, and effectiveness demonstrated by those sprays having toxic components. Some of the nontoxic insecticidal sprays are only effective against the fly over a long period of time after contact or ingestion, for example, longer than 90 seconds. Many of these non-toxic insecticidal sprays only gradually slow the fly's mobility over time, finally rendering the fly immobile so that an apparatus can be used to eliminate the fly.

Another problem is that these sprays only kill the adult fly, not the pupa, or vice versa. Other insecticides for consumer use require a substantial amount of toxic chemicals to effectively inhibit mobility and kill flies. Even then, many conventional insecticides for consumer use are not actually effective in killing the flies due to the concentrations used.

Many chemical compositions used in sprayable solutions for killing houseflies are not ingestible or non-toxic to humans, even if inadvertently sprayed on a surface. An ingestible surfactant is sodium dioctyl sulfosuccinate, known in one form as Docusate, and is typically used as a laxative for treating constipation, and not as an active ingredient for killing *Musca domestica* Linnaeus adult flies and pupa. Glycerin, or glycerol, is not usually used as an active ingredient in a spray composition to kill the same kind of adult flies and pupa. Arguably relevant references teach that glycerin, or glycerol, is commonly used as an adjuvant, a filler, an inactive ingredient, a solvent, an activator for another active ingredient, and/or as a plasticizer.

A need exists for a sprayable insecticidal composition having effective amounts of active ingredients to immobilize and kill adult flies and pupa while being non-toxic and ingestible for humans.

A need exists for a sprayable insecticidal composition that is a cost-effective, efficient way to immobilize and kill *Musca domestica* Linnaeus adult flies and pupa.

A need exists for a sprayable insecticidal composition having docusate (dioctyl sodium sulfosuccinate) as an active ingredient for killing *Musca domestica* Linnaeus flies and pupa, with docusate being used as an ingestible surfactant for non-toxic exposure to humans and for use as a mild cleaning agent for a surface.

A need exists for a sprayable insecticidal composition having both docusate and glycerin as active ingredients for killing flies and pupa, with the composition being non-toxic and ingestible for humans, and with the glycerin being used to immobilize and kill flies and pupa by at least suffocation.

None of the patent references teach, disclose, or suggest the claimed invention for the intended purpose. None of the patent references teach, disclose, or suggest a sprayable insecticidal composition comprising effective amounts of a nonabrasive, nontoxic, ingestible surfactant, a cleansing component, glycerin, and an essential oil for immobilizing and killing adult flies and pupa while being non-toxic and ingestible for humans and human contact.

SUMMARY OF THE INVENTION

In general, the invention is an insecticide that has a sprayable direct contact immobilizing and lethal formula against the *Musca domestica* Linnaeus house fly which exhibits adulticidal and pupicidal properties. After application by a direct spray of an adequate dose onto the body surface of the *Musca domestica* Linnaeus house fly, this insecticide exhibits prompt adulticidal results with death typically occurring in less than ninety seconds, while the insecticide is prepared with components safe for human ingestion. With the exception of dihydrogen monoxide, all of the individual formula components have been demonstrated to independently exhibit varying house fly adulticidal properties to include docusate sodium, Tween-80, glycerin, and anise.

In general, the invention is an insecticide for use as an adulticide and a pupicide for killing *Musca domestica* Linnaeus flies and *Musca domestica* Linnaeus pupa, with the insecticide being nontoxic, nonabrasive, and ingestible for humans. More particularly, the invention is an insecticide for use as an adulticide and a pupicide against *Musca domestica* Linnaeus flies and *Musca domestica* Linnaeus pupa, with the insecticide being nontoxic and ingestible for humans, the insecticide comprising (including or having): an effective amount of dioctyl sulfosuccinate as a first component of the insecticide; an effective amount of glycerin as a second component of the insecticide; and an effective amount of anise as a third component of the insecticide; wherein each of the components of the insecticide are combined with water at room temperature as a ready-to-use solution to immobilize and kill *Musca domestica* Linnaeus flies and *Musca domestica* Linnaeus pupa; wherein the solution is applied to *Musca domestica* Linnaeus flies and *Musca domestica* Linnaeus pupa, with the first component dioctyl sulfosuccinate being an active ingredient for killing the *Musca domestica* Linnaeus flies and *Musca domestica* Linnaeus pupa and for being nontoxic and ingestible to humans, with second component glycerin for rendering the *Musca domestica* Linnaeus flies and *Musca domestica* Linnaeus pupa incapable of flight and for preserving the solution at room temperature for at least one month, and with the third component anise for releasing a fragrant scent when the solution is dispersed. Glycerin also demonstrates singular adulticidal properties. Anise also demonstrates singular adulticidal properties independent of its minute ethyl alcohol content.

In another embodiment, the invention is an insecticide for use as an adulticide and a pupicide against *Musca domestica* Linnaeus flies and *Musca domestica* Linnaeus pupa, with the insecticide being nontoxic and ingestible for humans, the insecticide comprising: an effective amount of dioctyl sulfosuccinate as a first component of the insecticide; an effective amount of glycerin as a second component of the insecticide; and an effective amount of an essential oil as a third component of the insecticide; wherein each of the components of the insecticide are combined with water at room temperature as a ready-to-use solution to immobilize and kill *Musca domestica Linnaeus flies and Musca domestica* Linnaeus pupa; wherein the solution is applied to the *Musca domestica* Linnaeus flies and *Musca domestica* Linnaeus pupa, with the first component dioctyl sulfosuccinate being an active ingredient for killing the *Musca domestica* Linnaeus flies and *Musca domestica* Linnaeus pupa and for being nontoxic and ingestible for humans, with second component glycerin for rendering the *Musca domestica* Linnaeus flies and *Musca domestica* incapable of flight and for preserving the solution at room temperature for at least one month, and with the third component essential oil for releasing a fragrant scent when the solution is dispersed. Anise and glycerin each also have insecticidal properties.

In yet another embodiment, the invention is an insecticide for use as an adulticide and a pupicide against *Musca domestica* Linnaeus flies and *Musca domestica* Linnaeus pupa, with the insecticide being nontoxic and ingestible for humans, the insecticide comprising: an effective amount of 5 mg/mL of dioctyl sodium sulfosuccinate as a first component of the insecticide; an effective amount of glycerin as a second component of the insecticide; and an effective amount of anise as a third component of the insecticide; wherein each of the components of the insecticide are combined with water at room temperature as a ready-to-use solution to immobilize and kill *Musca domestica* Linnaeus flies and *Musca domestica* Linnaeus pupa; wherein the solution is applied to the *Musca domestica* Linnaeus flies and *Musca domestica* Linnaeus pupa, with the first component dioctyl sodium sulfosuccinate being an active ingredient for killing the *Musca domestica* Linnaeus flies and *Musca domestica* Linnaeus pupa and for being nontoxic and ingestible for humans, with second component glycerin for rendering the *Musca domestica* Linnaeus flies and *Musca domestica* incapable of flight and for preserving the solution at room temperature for at least one month, and with the third component anise for releasing a fragrant scent when the solution is dispersed. Anise and glycerin each also have insecticidal properties.

This insecticide Solution is preferably provided as a spray or aerosol. The Solution composition is lethal to both pupa and adult flies while being nontoxic, nonabrasive, and ingestible for humans if the Solution or its residue comes into contact with a surface, or inhaled or consumed by humans. The "surface" refers to, but is not limited to, food, a tabletop, a countertop, a person's hands, a wall, and any other surface for which a human comes into contact. Once the Solution is applied to fly pupa, the pupa subsequently dies after application by either not hatching altogether or the fly not surviving after hatching.

The Solution utilizes at least a four step process: 1) the surfactant (dioctyl sodium sulfosuccinate) blocks the fly's trachea and causes suffocation; 2) the glycerin has enough viscosity that, due to its weight, impedes the fly from flying in addition to blocking the fly's trachea; and 3) the use of anise, a licorice-flavored aromatic scent for human benefit. This Solution kills flies faster than if the individual components or ingredients were used.

It is an object of this invention is to provide a sprayable insecticidal composition having effective amounts of active ingredients to immobilize and kill *Musca domestica* Linnaeus adult flies and pupa, with the composition being non-toxic and ingestible for humans.

It is an object of this invention is to provide a sprayable insecticidal composition that is a cost-effective, efficient way to immobilize and kill *Musca domestica* Linnaeus adult flies and pupa.

It is an object of this invention is to provide a sprayable insecticidal composition having dioctyl sodium sulfosuccinate as an active ingredient for killing *Musca domestica* Linnaeus flies and pupa, with dioctyl sodium sulfosuccinate being also used as an ingestible surfactant for non-toxic exposure to humans and for use as a mild cleaning agent for a surface.

It is an object of this invention to provide a sprayable insecticidal composition having dioctyl sodium sulfosuccinate, glycerin, and anise, with the dioctyl sodium sulfosuccinate being an active ingredient for killing *Musca domestica* Linnaeus flies and pupa, with the composition being non-toxic and ingestible for humans, with the glycerin being used to immobilize and kill flies and pupa by at least suffocation, and with the anise being used as a fragrant scent for humans when the composition is dispersed.

Other objects and advantages of the invention will become more apparent from the summary and detailed description of this specification.

BRIEF DESCRIPTION OF THE SEVERAL VIEWS OF THE DRAWING

The invention may be more readily described by reference to the accompanying drawing figures and the following description of the drawing figures. The reference numbers apply to each embodiment of the invention. In the drawing:

FIG. 1. is a table of a dilution experiment of 50% dilution docusate and a dihydrogen monoxide control using a needle inoculum and a spray inoculum;

FIG. 2. is a table of a dilution experiment of 75% dilution docusate and a dihydrogen monoxide control using a needle inoculum and a spray inoculum;

FIG. 3. is a table of a dilution experiment of 90% dilution docusate and a dihydrogen monoxide control using a needle inoculum and a spray inoculum;

FIG. 4. is a table of a dilution experiment of 95% dilution docusate and a dihydrogen monoxide control using a needle inoculum and a spray inoculum;

FIG. 5. is a table of a dilution experiment of 99% dilution docusate and a dihydrogen monoxide control using a needle inoculum and a spray inoculum;

FIG. 6. is a table of a dilution experiment of 0% dilution docusate and a dihydrogen monoxide control using a needle inoculum and a spray inoculum;

FIG. 7. is a table of a dilution experiment of 50% dilution glycerin and a dihydrogen monoxide control using a needle inoculum and a spray inoculum;

FIG. 8. is a table of a dilution experiment of 75% dilution glycerin and a dihydrogen monoxide control using a needle inoculum and a spray inoculum;

FIG. 9. is a table of a dilution experiment of 90% dilution glycerin and a dihydrogen monoxide control using a needle inoculum and a spray inoculum;

FIG. 10. is a table of a dilution experiment of 0% dilution glycerin and a dihydrogen monoxide control using a needle inoculum and a spray inoculum;

FIG. 11. is a table of a dilution experiment of 50% dilution anise and a dihydrogen monoxide control using a needle inoculum and a spray inoculum;

FIG. 12. is a table of a dilution experiment of 75% dilution anise and a dihydrogen monoxide control using a needle inoculum and a spray inoculum;

FIG. 13. is a table of a dilution experiment of 90% dilution anise and a dihydrogen monoxide control using a needle inoculum and a spray inoculum;

FIG. 14. is a table of a dilution experiment of 0% dilution anise and a dihydrogen monoxide control using a needle inoculum and a spray inoculum;

FIG. 15. is a table of a dilution experiment of 0.9% dilution saline and a dihydrogen monoxide control using a needle inoculum and a spray inoculum;

FIG. 16. is a table of a dilution experiment of 3% dilution saline and a dihydrogen monoxide control using a needle inoculum and a spray inoculum;

FIG. 17. is a table of a dilution experiment of 20% dilution saline and a dihydrogen monoxide control using a needle inoculum and a spray inoculum;

FIG. 18. is a table of a dilution experiment of 37.5% dilution saline and a dihydrogen monoxide control using a needle inoculum and a spray inoculum;

FIG. 19. is a table of a formula experiment for fly larvae using a spray inoculum (Solution 1; Solution 2, respectively);

FIG. 20. is a table of a formula experiment for fly pupa using a spray inoculum (Solution 1; Solution 2, respectively);

FIG. 21. is a table of a formula experiment for adult flies using a spray inoculum (Solution 1; Solution 2, respectively);

FIG. 22. is a table of a dilution experiment of 50% dilution TWEEN-80 and a dihydrogen monoxide control using a needle inoculum and a spray inoculum;

FIG. 23. is a table of a dilution experiment of 75% dilution TWEEN-80 and a dihydrogen monoxide control using a needle inoculum and a spray inoculum;

FIG. 24. is a table of a dilution experiment of 90% dilution TWEEN-80 and a dihydrogen monoxide control using a needle inoculum and a spray inoculum;

FIG. 25. is a table of a dilution experiment of 0% dilution TWEEN-80 and a dihydrogen monoxide control using a needle inoculum and a spray inoculum;

FIG. 26. is a table of a dilution experiment of 50% dilution ethyl alcohol and a dihydrogen monoxide control using a needle inoculum and a spray inoculum;

FIG. 27. is a table of a dilution experiment of 75% dilution ethyl alcohol and a dihydrogen monoxide control using a needle inoculum and a spray inoculum;

FIG. 28. is a table of a dilution experiment of 90% dilution ethyl alcohol and a dihydrogen monoxide control using a needle inoculum and a spray inoculum;

FIG. 29. is a table of a dilution experiment of 0% dilution ethyl alcohol and a dihydrogen monoxide control using a needle inoculum and a spray inoculum;

FIG. 30. is a table of a dilution experiment of dioctyl sodium sulfosuccinate and a dihydrogen monoxide control using a spray inoculum;

FIG. 31. is a table of a formula experiment for adult flies using a spray inoculum (Solution 3; Solution 4, respectively);

FIG. 32. is a table of a formula experiment for adult flies using a spray inoculum (Solution 5; Solution 6, respectively); and FIG. 33. is a table of a formula experiment for adult flies using a spray inoculum (Solution 7; Solution 8, respectively).

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The concentrations, formulas, and composition noted herein have been evaluated and tested for optimal effect against adult houseflies and pupa. Altering the preferred concentrations would decrease the effectiveness of the inventive Solution, leading to longer a time period before the flies and/or pupa are killed. The Solution may be poured into a container having a spray nozzle or provided in an aerosol container. Alternatively, the Solution may be poured into an open container for direct contact. The Solution may be poured directly onto pupa or sprayed. Several experiments were performed on *Musca domestica* Linnaeus adult houseflies, pupa, and larva using varying dilutions, concentrations, and combinations of components, along with a dihydrogen monoxide control to compare the effectiveness and potency of each composition for quickly killing adult flies, pupa, and larva. For the preferred compositions, adult flies died within moments, notably seconds, after administering the spray on them. These minimal moments of delay between contact and expiration prevents the fly from falling and immediately dying in an undesired location, for example, on a food surface. A film of the Solution covers at least part of a fly's trachea after the solution is applied to the fly, then the film deprives the fly of oxygen causing suffocation and also weighs down the fly rendering it incapable of flight. The user can either wait for the fly to die solely from the spray, or, alternatively, the user can implement using the spray as one of the first steps for disabling the fly before immediately killing the fly with either more application of the sprayable composition or with another aid, for example, a fly swatter.

Each of the formulas identified work as an adulticide and a pupicide, while remaining nontoxic, nonabrasive, and ingestible for humans. When either of these Solutions are applied to adult flies or to fly pupa, the flies are killed within moments of contact. For optimal use, the composition may be shaken prior to each use. The Solution may be stored at room temperature for at least one month, and preferably several months, without losing its potency because glycerin further acts as a preservative for the Solution. By keeping the Solution at room temperature in an accessible container with a spray nozzle, the user can quickly access the Solution at a moment's notice to kill flies or pupa.

The invention, when sprayed on fly pupa, prevents the pupa from hatching. The preferred type of fly and fly pupa that are effectively killed by this Solution are *Musca domestica* Linnaeus houseflies. Because the composition (or Solution) is nontoxic, nonabrasive, and ingestible for humans, the Solution can be sprayed or applied directly to a surface, including food. Various experiments were conducted to evaluate the efficacy of each component used in the Solution.

Dicotyl sulfosuccinate is a surfactant soap that is ingested by the flies before suffocating them. An example of dicotyl sulfosuccinate is dioctyl sodium sulfosuccinate. The pure dioctyl sodium sulfosuccinate demonstrates good activity for killing flies and pupa, however, this pure compound is not palatable to most individuals. Another example of dioctyl sodium sulfosuccinate is docusate, more particularly docusate sodium, also called liquid docusate. Dioctyl sodium sulfosuccinate is safe for limited human consumption. Liquid docusate is generally used as a laxative. Diluting the amount of dioctyl sodium sulfosuccinate makes it more palatable if tasted by humans. Dioctyl sodium sulfosuccinate is the preferred active ingredient in this Solution for killing *Musca domestica* Linnaeus adult houseflies and pupa while keeping the Solution ingestible and nontoxic for human contact and ingestion. If the Solution contacts a surface then is ingested by a human, ingesting this component is not toxic. Dioctyl sodium sulfosuccinate is useful as a cost-effective ingestible surfactant soap over a surfactant soap, for example, polysorbate-80 compound (TWEEN-80). Dioctyl sodium sulfosuccinate has been determined to be an effective fly killing agent. The flies are immobilized and collapse within 30-60 seconds.

During experimentation, a needle inoculum (syringe) having a modified composition for adult flies, a spray inoculum having the modified composition for adult flies, and a dihydrogen monoxide control for adult flies were conducted. References to "needle inoculum" refers to directly applying the modified composition to the adult flies. Needle inoculum and spray inoculum techniques were used; however, there was little to no appreciable difference between the needle inoculum and spray inoculum. FIG. 1 is a table showing a needle inoculum of 50% dilution of docusate with water at 75° F. were applied to adult flies, resulting in 10 out of 10 deaths within 56 seconds. The spray inoculum of a 50% dilution of docusate with water at 75° F. were applied to adult houseflies, resulting in 10 out of 10 deaths within 43 seconds. The control was a dihydrogen monoxide control, and when applied to adult flies via needle inoculum and to adult flies via spray inoculum for the same respective time periods, each yielded 0 out of 10 deaths.

FIG. 2 is a table showing a needle inoculum of 75% dilution of docusate with water at 75° F. were applied to adult flies, resulting in 10 out of 10 deaths within 126 seconds. The spray inoculum of a 50% dilution of docusate with water at 75° F. were applied to adult houseflies, resulting in 10 out of 10 deaths within 89 seconds. The control was a dihydrogen monoxide control, and when applied to adult flies via needle inoculum and to adult flies via spray inoculum for the same respective time periods, each yielded 0 out of 10 deaths.

FIG. 3 is a table showing a needle inoculum of 90% dilution of docusate with water at 75° F. were applied to adult flies, resulting in 10 out of 10 deaths within 121 seconds. The spray inoculum of a 90% dilution of docusate with water at 75° F. were applied to adult houseflies, resulting in 10 out of 10 deaths within 143 seconds. The control was a dihydrogen monoxide control, and when applied to adult flies via needle inoculum and to adult flies via spray inoculum for the same respective time periods, each yielded 0 out of 10 deaths.

FIG. 4 is a table showing a needle inoculum of 95% dilution of docusate with water at 75° F. were applied to adult flies, resulting in 10 out of 10 deaths within 4 minutes and 58 seconds. The spray inoculum of a 95% dilution of docusate with water at 75° F. were applied to adult houseflies, resulting in 10 out of 10 deaths within 5 minutes and 11 seconds. The control was a dihydrogen monoxide control, and when applied to adult flies via needle inoculum and to adult flies via spray inoculum for the same respective time periods, each yielded 0 out of 10 deaths.

FIG. 5 is a table showing a needle inoculum of 99% dilution of docusate with water at 75° F. were applied to adult flies, resulting in 10 out of 10 deaths within 6 minutes and 46 seconds. The spray inoculum of a 99% dilution of docusate with water at 75° F. were applied to adult houseflies, resulting in 10 out of 10 deaths within 5 minutes and 37 seconds. The control was a dihydrogen monoxide control, and when applied to adult flies via needle inoculum yielded 1 out of 10 deaths within 6 minutes and 46 seconds, and to adult flies via spray inoculum within 5 minutes and 37 seconds yielded 0 out of 10 deaths.

FIG. 6 is a table showing a needle inoculum of 0% dilution of docusate at 75° F. were applied to adult flies, resulting in 10 out of 10 deaths within 48 seconds. The spray inoculum of no dilution of docusate at 75° F. were applied to adult houseflies, resulting in 10 out of 10 deaths within 68 seconds. The control was a dihydrogen monoxide control, and when applied to adult flies via needle inoculum and to adult flies via spray inoculum for the same respective time periods, each yielded 0 out of 10 deaths.

FIG. 30 is a table showing a needle inoculum of 0% dilution of 10 mg/mL dioctyl sodium sulfosuccinate at 75° F. were applied to adult flies, resulting in 10 out of 10 deaths within 36 seconds. At 50% dilution of dioctyl sodium sulfosuccinate at the same temperature resulted in 10 out of 10 deaths within 46 seconds. At 90% dilution, the experiment resulted in 10 out of 10 deaths within 188 seconds.

Glycerin, or glycerol, is a viscous, water-soluble liquid that is nontoxic, nonabrasive, and ingestible for humans. Glycerin may also be used as a humectant or sweetener to attract adult flies to the Solution after the Solution is sprayed onto a surface. Glycerin may further be used as a preservative and as a thickening agent for the Solution when keeping the solution at room temperature for an extended period of time, for example, at least one month up to several months. Due to the weight of glycerin, glycerin is useful in the Solution by weighing down the flies, knocking them down, and immobilizing them.

During experimentation with glycerin, a needle inoculum for adult flies, a spray inoculum for adult flies, and a dihydrogen monoxide control for adult flies were conducted. FIG. 7 is a table showing a needle inoculum of 50% dilution of glycerin with water at 75° F. were applied to adult flies, resulting in 5 out of 10 deaths within 30 minutes, and during that time they were incapable of flight. The spray inoculum of a 50% dilution of glycerin with adult flies at 75° F. were applied to adult houseflies, resulting in 6 out of 10 deaths within 30 minutes, and during that time they were incapable of flight. The control was a dihydrogen monoxide control, and when applied to adult flies via needle inoculum yielded 1 out of 10 deaths and to adult flies via spray inoculum yielded 2 out of 10 deaths, each for the same respective time periods.

FIG. 8 is a table showing a needle inoculum of 75% dilution of glycerin with water at 75° F. were applied to adult flies, resulting in 4 out of 10 deaths within 30 minutes, and during that time they were incapable of flight. The spray inoculum of a 50% dilution of glycerin with water at 75° F. were applied to adult houseflies, resulting in 6 out of 10 deaths within 30 minutes, and during that time they were incapable of flight. The control was a dihydrogen monoxide control, and when applied to adult flies via needle inoculum yielded 1 out of 10 deaths and to adult flies via spray inoculum yielded 0 out of 10 deaths, each for the same respective time periods.

FIG. 9 is a table showing a needle inoculum of 90% dilution of glycerin with water at 75° F. were applied to adult flies, resulting in 2 out of 10 deaths within 30 minutes, and during that time they were incapable of flight. The spray inoculum of a 90% dilution of glycerin with water at 75° F. were applied to adult houseflies, resulting in 7 out of 10 deaths within 30 minutes, and during that time they were incapable of flight. The control was a dihydrogen monoxide control, and when applied to adult flies via needle inoculum yielded 1 out of 10 deaths and to adult flies via spray inoculum yielded 1 out of 10 deaths, each for the same respective time periods.

FIG. 10 is a table showing a needle inoculum of no (0%) dilution of glycerin at 75° F. were applied to adult flies, resulting in 0 out of 10 deaths within 30 minutes, and during that time they were incapable of flight. The spray inoculum of no dilution of glycerin at 75° F. were applied to adult houseflies, resulting in 0 out of 10 deaths within 30 minutes, and during that time they were incapable of flight. The control was a dihydrogen monoxide control, and when applied to adult flies via needle inoculum and to adult flies via spray inoculum for the same respective time periods, each yielded 0 out of 10 deaths.

Anise (or anise seed oil) is an essential oil extracted from the plant *Pimpinella anisum*. Anise releases a fragrant aromatic licorice scent. Anise is also used for flavoring. More importantly for the current context, Anise also kills flies. During experimentation of anise, a needle inoculum for adult flies, a spray inoculum for adult flies, and a dihydrogen monoxide control for adult flies and for adult flies were conducted. FIG. 11 is a table showing a needle inoculum of 50% dilution of anise with water at 75° F. were applied to adult flies, resulting in 10 out of 10 deaths within 22 minutes and 52 seconds. The spray inoculum of a 50% dilution of anise with water at 75° F. were applied to adult houseflies, resulting in 10 out of 10 deaths within 9 minutes and 6 seconds. The control was a dihydrogen monoxide control, and when applied to adult flies via needle inoculum yielded 0 out of 10 deaths and to adult flies via spray inoculum yielded 0 out of 10 deaths for the respective time periods.

FIG. 12 is a table showing a needle inoculum of 75% dilution of anise with water at 75° F. were applied to adult flies, resulting in 10 out of 10 deaths within 28 minutes and 33 seconds. The spray inoculum of a 50% dilution of anise with water at 75° F. were applied to adult houseflies, resulting in 10 out of 10 deaths within 11 minutes and 3 seconds. The control was a dihydrogen monoxide control, and when applied to adult flies via needle inoculum yielded 0 out of 10 deaths and to adult flies via spray inoculum yielded 0 out of 10 deaths for the same respective time periods.

FIG. 13 is a table showing a needle inoculum of 90% dilution of anise with water at 75° F. were applied to adult flies, resulting in 2 out of 10 deaths within 30 minutes, and during that time they were incapable of flight. The spray inoculum of a 90% dilution of anise with water at 75° F. were applied to adult houseflies, resulting in 5 out of 10 deaths within 30 minutes, and during that time they were incapable of flight. The control was a dihydrogen monoxide control, and when applied to adult flies via needle inoculum yielded 0 out of 10 deaths and to adult flies via spray inoculum yielded 1 out of 10 deaths for the same respective time periods.

FIG. 14 is a table showing a needle inoculum of no (0%) dilution of anise at 75° F. were applied to adult flies, resulting in 10 out of 10 deaths within 4 minutes and 11 seconds. The spray inoculum of no dilution of anise at 75° F. were applied to adult houseflies, resulting in 10 out of 10 deaths within 3 minutes and 32 seconds. The control was a dihydrogen monoxide control, and when applied to adult flies via needle inoculum and to adult flies via spray inoculum for the same respective time periods, each yielded 0 out of 10 deaths.

After further experimentation of saline, use of saline as part of the composition had no effect in killing the flies or pupa. Therefore, adding saline, whether hypertonic saline or isotonic saline, to the Solution is not preferred, and only adds to the cost of the product. During experimentation of saline, a needle inoculum for adult flies, a spray inoculum for adult flies, and a dihydrogen monoxide control for fly pupa and for adult flies were conducted. FIG. 15 is a table showing a needle inoculum of 0.9% dilution of saline with water at 75° F. were applied to adult flies, resulting in 0 out of 10 deaths within 30 minutes, and during that time they were incapable of flight. The spray inoculum of a 0.9% dilution of saline with water at 75° F. were applied to adult houseflies, resulting in 1 out of 10 deaths within 30 minutes, and during that time they were incapable of flight. The control was a dihydrogen monoxide control, and when applied to adult flies via needle inoculum yielded 1 out of 10 deaths and to adult flies via spray inoculum yielded 1 out of 10 deaths for the respective time periods.

FIG. 16 is a table showing a needle inoculum of 3% dilution of saline with water at 75° F. were applied to adult flies, resulting in 0 out of 10 deaths within 30 minutes, and during that time they were incapable of flight. The spray inoculum of a 3% dilution of saline with water at 75° F. were applied to adult houseflies, resulting in 0 out of 10 deaths within 30 minutes, and during that time they were incapable of flight. The control was a dihydrogen monoxide control, and when applied to adult flies via needle inoculum yielded 0 out of 10 deaths and to adult flies via spray inoculum yielded 0 out of 10 deaths for the same respective time periods.

FIG. 17 is a table showing a needle inoculum of 20% dilution of saline with water at 75° F. were applied to adult flies, resulting in 0 out of 10 deaths within 30 minutes, and during that time they were incapable of flight. The spray inoculum of a 20% dilution of saline with water at 75° F. were applied to adult houseflies, resulting in 0 out of 10 deaths within 30 minutes, and during that time they were incapable of flight. The control was a dihydrogen monoxide control, and when applied to adult flies via needle inoculum yielded 0 out of 10 deaths and to adult flies via spray inoculum yielded 0 out of 10 deaths for the same respective time periods.

FIG. 18 is a table showing a needle inoculum of 37.5% of saline with water at 75° F. were applied to adult flies, resulting in 0 out of 10 deaths within 30 minutes, and during that time they were incapable of flight. The spray inoculum of 37.5% of saline with water at 75° F. were applied to adult houseflies, resulting in 0 out of 10 deaths within 30 minutes, and during that time they were incapable of flight. The control was a dihydrogen monoxide control, and when applied to adult flies via needle inoculum and to adult flies via spray inoculum for the same respective time periods, each yielded 0 out of 10 deaths.

In an experiment and in one embodiment, the sprayable composition preferably comprises docusate, glycerin, anise, and dihydrogen monoxide. More particularly, 10.0 mL docusate, 10.0 mL glycerin, 2.5 mL anise, and 77.5 mL dihydrogen monoxide (collectively, "Solution 1") were combined and agitated at 75° F. As shown in FIG. 19, this Solution 1 was applied as a spray inoculum to fly larvae, resulting in 0 out of 10 deaths within 30 minutes. The control, 100.0 mL dihydrogen monoxide, yielded the same results for larvae and adult flies, as shown in FIGS. 19 and 21. As shown in FIG. 21, Solution 1 was applied as a spray inoculum to adult flies, resulting at 10 out of 10 deaths in 64 seconds, nothing that 50% dilution docusate, 100% glycerin, 100% anise, and 100% water concentrations was the preferred formula in this experiment. As shown in FIG. 20, Solution 1 was applied as a spray inoculum to fly pupa and observed over a three-day period, resulting in 10 out of 10 deaths, and in 45 out of 50 deaths. Concerning the 45 out of 50 deaths, 5 flies were dead, and 1 fly remained alive. The control, 100.0 mL dihydrogen monoxide, was applied as a spray inoculum to pupa, resulting in 3 out of 10 deaths, and in 4 out of 50 deaths. In the 3 out of 10 deaths of the water control, 7 flies lived. In the 4/50 deaths of the water control, 46 flies lived. For pupa experimentation, the sprayable Solution was sprayed onto flies in the pupa or cocoon stage, and observed over 3 days. References to "dead" in this manner refers to flies that emerged from the cocoon dead or otherwise died quickly upon hatching. References to "live" in this manner refers to only a single pupa hatched into one single live fly.

Further experimentation was conducted using a viscous, water-soluble emulsifier to test the insecticidal properties against house flies. The emulsifier also adheres to the adult flies in the form of a film that essentially suffocates the fly's respiratory system by preventing oxygen and water from getting through to the fly. Polysorbate-80 is a preferred, effective emulsifier. Preferably, the polysorbate-80 is a non-ionic, viscous, water-soluble surfactant. An example of polysorbate-80 is a compound known by the trademark TWEEN-80. Using polysorbate-80 is somewhat useful for killing adult flies, but is less effective than the combination of components in the preferred embodiment of the Solution. Adding TWEEN-80 to the solution may provide some additional adulticidal efficacy.

During experimentation of TWEEN-80, a needle inoculum for adult flies, a spray inoculum for adult flies, and a dihydrogen monoxide control for adult flies were conducted. FIG. 22 is a table showing a needle inoculum of 50% dilution of TWEEN-80 with water at 75° F. were applied to adult flies, resulting in 10 out of 10 deaths within 10 minutes and 22 seconds. The spray inoculum of a 50% dilution of TWEEN-80 with water at 75° F. were applied to adult houseflies, resulting in 10 out of 10 deaths within 7 minutes and 35 seconds. The control was a dihydrogen monoxide control, and when applied to adult flies via needle inoculum yielded 1 out of 10 deaths and to adult flies via spray inoculum yielded 0 out of 10 deaths for the respective time periods.

FIG. 23 is a table showing a needle inoculum of 75% dilution of TWEEN-80 with water at 75° F. were applied to adult flies, resulting in 10 out of 10 deaths within 12 minutes and 59 seconds. The spray inoculum of a 50% dilution of TWEEN-80 with adult flies at 75° F. were applied to adult houseflies, resulting in 10 out of 10 deaths within 6 minutes and 47 seconds. The control was a dihydrogen monoxide control, and when applied to adult flies via needle inoculum yielded 0 out of 10 deaths and to adult flies via spray inoculum yielded 0 out of 10 deaths for the same respective time periods.

FIG. 24 is a table showing a needle inoculum of 90% dilution of TWEEN-80 with water at 75° F. were applied to adult flies, resulting in 5 out of 10 deaths within 30 minutes, and during that time they were incapable of flight. The spray inoculum of a 90% dilution of TWEEN-80 with water at 75° F. were applied to adult houseflies, resulting in 10 out of 10 deaths within 7 minutes and 34 seconds. The control was a dihydrogen monoxide control, and when applied to adult flies via needle inoculum yielded 1 out of 10 deaths and to adult flies via spray inoculum yielded 1 out of 10 deaths for the same respective time periods.

FIG. 25 is a table showing a needle inoculum of no dilution of TWEEN-80 at 75° F. were applied to adult flies, resulting in 10 out of 10 deaths within 3 minutes and 5 seconds. The spray inoculum of no dilution of TWEEN-80 at 75° F. were applied to adult houseflies, resulting in 10 out of 10 deaths within 3 minutes and 35 seconds. The control was a dihydrogen monoxide control, and when applied to adult flies via needle inoculum and to adult flies via spray inoculum for the same respective time periods, each yielded 0 out of 10 deaths.

In another experiment, the sprayable composition comprised TWEEN-80, glycerin, anise, and dihydrogen monoxide. More particularly, 10.0 mL TWEEN-80, 10.0 mL glycerin, 2.5 mL anise, and 77.5 mL dihydrogen monoxide (collectively, "Solution 2") were combined and agitated at 75° F. As shown in FIG. 19, this solution was applied as a spray inoculum to fly larvae, resulting in 0 out of 10 deaths within 30 minutes. The control, 100.0 mL dihydrogen monoxide, yielded the same results. As shown in FIG. 20, Solution 2 was applied as a spray inoculum to fly pupa and observed over a three-day period, resulting in 10 out of 10 deaths, and 50 out of 50 deaths. In the 10/10 deaths, 3 flies were dead. In the 50 out of 50 deaths, 10 flies were dead. As shown in FIG. 21, Solution 2 was applied as a spray inoculum to adult flies, resulting at 10 out of 10 deaths within 273 seconds.

As shown in FIG. 31, Solution 3 (first formula) was applied as a spray inoculum to adult flies, resulting at 10 out of 10 deaths in 351 seconds. 25.0 mL docusate, 25.0 mL Tween-80, 10.0 mL glycerin, and 40.0 mL water was the preferred formula in this experiment. The water control yielded 0 out of 10 deaths.

As shown in FIG. 31, Solution 4 (second formula) was applied as a spray inoculum to adult flies, resulting at 10 out of 10 deaths in 273 seconds. 30.0 mL docusate, 10.0 mL Tween-80, 10.0 mL glycerin, and 40.0 mL water was the preferred formula in this experiment. The water control yielded 0 out of 10 deaths.

As shown in FIG. 32, Solution 5 (first formula) was applied as a spray inoculum to adult flies, resulting at 10 out of 10 deaths in 192 seconds. 30.0 mL docusate, 1.0 mL Tween-80, 20.0 mL glycerin, and 49.0 mL water was the preferred formula in this experiment. The water control yielded 0 out of 10 deaths.

As shown in FIG. 32, Solution 6 (second formula) was applied as a spray inoculum to adult flies, resulting at 10 out of 10 deaths in 559 seconds. 35.0 mL docusate, 5.0 mL Tween-80, 15.0 mL glycerin, and 45.0 mL water was the preferred formula in this experiment. The water control yielded 0 out of 10 deaths.

As shown in FIG. 33, Solution 7 (first formula) was applied as a spray inoculum to adult flies, resulting at 10 out of 10 deaths in 109 seconds. 50.0 mL docusate, 10.0 mL glycerin, and 40.0 mL water were the preferred formula in this experiment. The water control yielded 0 out of 10 deaths.

As shown in FIG. 33, Solution 8 (second formula) was applied as a spray inoculum to adult flies, resulting at 10 out of 10 deaths in 47 seconds. 50.0 mL docusate, 5.0 mL Tween-80, 10.0 mL glycerin, and 35.0 mL water was the preferred formula in this experiment. The water control yielded 0 out of 10 deaths.

The liquid ingestible soap or cleansing agent, notably the dioctyl sodium sulfosuccinate, allows the user to begin cleaning the surface that was touched by the fly as part of the decontamination process. A reason for the selection of components in this set of experiments is that the effective amounts of dioctyl sodium sulfosuccinate, glycerin, and anise kills the flies and the pupa. The composition is nontoxic, nonabrasive, and ingestible for humans if small amounts are inadvertently ingested, inhaled or touched.

A component of the essential oil anise is ethyl alcohol. Ethyl alcohol was tested for its efficacy as an adulticide. The results yielded unfavorable results. Using ethyl alcohol during experimentation, a needle inoculum for adult flies, a spray inoculum for adult flies, and a dihydrogen monoxide control for fly pupa and for adult flies were conducted. FIG. 26 is a table showing a needle inoculum of 50% dilution of ethyl alcohol with water at 75° F. were applied to adult flies, resulting in 10 out of 10 deaths within 18 minutes and 19 seconds, and during that time they were incapable of flight. The spray inoculum of 50% dilution of ethyl alcohol with water at 75° F. were applied to adult houseflies, resulting in 10 out of 10 deaths within 14 minutes and 44 seconds. The control was a dihydrogen monoxide control, and when applied to adult flies via needle inoculum yielded 0 out of 10 deaths and to adult flies via spray inoculum yielded 0 out of 10 deaths for the respective time periods.

FIG. 27 is a table showing a needle inoculum of 75% dilution of ethyl alcohol with water at 75° F. were applied to adult flies, resulting in 1 out of 10 deaths within 30 minutes, and during that time they were incapable of flight. The spray inoculum of 75% dilution of ethyl alcohol with water at 75° F. were applied to adult houseflies, resulting in 4 out of 10 deaths within 30 minutes, and during that time they were incapable of flight. The control was a dihydrogen monoxide control, and when applied to adult flies via needle inoculum yielded 0 out of 10 deaths and to adult flies via spray inoculum yielded 0 out of 10 deaths for the same respective time periods.

FIG. 28 is a table showing a needle inoculum of 90% dilution of ethyl alcohol with water at 75° F. were applied to adult flies, resulting in 0 out of 10 deaths within 30 minutes, and during that time they were incapable of flight. The spray inoculum of 90% dilution of ethyl alcohol with water at 75° F. were applied to adult houseflies, resulting in 1 out of 10 deaths within 30 minutes, and during that time they were incapable of flight. The control was a dihydrogen monoxide control, and when applied to adult flies via needle inoculum yielded 0 out of 10 deaths and to adult flies via spray inoculum yielded 0 out of 10 deaths for the same respective time periods.

FIG. 29 is a table showing a needle inoculum of no dilution of ethyl alcohol at 75° F. were applied to adult flies, resulting in 10 out of 10 deaths within 3 minutes and 53 seconds. The spray inoculum of no dilution of ethyl alcohol at 75° F. were applied to adult houseflies, resulting in 10 out of 10 deaths within 3 minutes and 11 seconds, and during that time they were incapable of flight. The control was a dihydrogen monoxide control, and when applied to adult flies via needle inoculum and to adult flies via spray inoculum for the same respective time periods, each yielded 0 out of 10 deaths.

In one embodiment, the invention is a sprayable insecticidal and pupicidal composition for killing houseflies and pupa, the composition or solution comprises an effective amount of 50 mL docusate (dioctyl sodium sulfosuccinate), an effective amount of 10 mL glycerin, and 40 mL dihydrogen monoxide combined, agitated, and held at room temperature in an easily accessible container. The composition may further comprise an effective amount of anise.

The experiments yielded data for an effective amount of dioctyl sodium sulfosuccinate/docusate sodium for the Solution. For a large stock spray bottle, used 12.5 mg per spray of docusate sodium, wherein 1 spray=2.5 mL. 50% dilution of docusate, 10 mg/mL=5 mg/mL. For a small stock spray bottle of 4 ounces or 100 mL, used 0.625 mg per spray of docusate sodium, wherein 1 spray=0.125 mL. 50% dilution of docusate, 10 mg/mL=5 mg/mL.

The experiments yielded data for an effective amount of glycerin for the Solution. Here, 10 mL of no dilution glycerin in the Solution having 12.6 mg/mL. An effective amount of glycerin concentration for the Solution was 1.26 g/mL. For a large stock spray bottle containing 32 ounces or 750 mL, used 31.5 mg of glycerin per large spray bottle, wherein 1 spray=2.5 mL with 12.6 mg/mL of glycerin. For small stock spray bottle containing 4 ounces or 100 mL, used 1.575 mg of glycerin per small spray bottle, wherein 1 spray=0.125 ml with 12.6 mg/mL of glycerin. When the Solution further contains Tween-80, an effective amount of Tween-80 concentration for the Solution was 1.09 g/mL.

The method of making each embodiment of the invention comprises the steps of measuring and combining each ingredient to form a solution, then pouring the solution at room temperature into a container having a spray nozzle, then agitating. The solution can maintain its adulticide and pupicidal potency and properties for several months when stored at room temperature. The user need not reconstitute the stored solution before each application on a fly or pupa.

The method of using each embodiment of the invention comprises the steps of spraying the Solution directly onto flies or pupa so that the Solution has a near-immediate reaction on the flies and pupa. Upon application to a fly, the dioctyl sodium sulfosuccinate, glycerin, and anise impacts the fly's respiratory system to kill it almost immediately, while preventing the fly from falling immediately from the air mid-flight. The fly is able to travel to at least a few more inches, albeit slowly before collapsing and expiring. The moments-delay effect on adult flies are distinguishable from toxic and/or non-ingestible sprays that attempt to kill-on-contact.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

We claim:

1. An insecticide composition comprising a synergistic combination of components:

a. an effective amount of dioctyl sulfosuccinate at a concentration of 5 mg/mL;

b. an effective amount of glycerin at a concentration of 12.6 mg/mL for attracting at least *Musca domestica* Linnaeus flies and *Musca domestica* Linnaeus pupa; and c. an effective amount of anise seed oil, wherein each of the components of the insecticide composition are combined with water at room temperature as a ready-to-use solution to immobilize and kill *Musca domestica* Linnaeus flies and *Musca domestica* Linnaeus pupa;

wherein the solution must be applied directly to *Musca domestica* Linnaeus flies and *Musca domestica* Linnaeus pupa or applied to a surface upon which *Musca domestica* Linnaeus flies and *Musca domestica* Linnaeus pupa contacts, with the first component dioctyl sulfosuccinate being an active ingredient for killing the *Musca domestica* Linnaeus flies and *Musca domestica* Linnaeus pupa and for being nontoxic and ingestible to humans, with second component glycerin for rendering the *Musca domestica* Linnaeus flies and *Musca domestica* Linnaeus pupa incapable of flight and for preserving the solution at room temperature for at least one month, and with the third component anise for releasing a fragrant scent when the solution is dispersed; and wherein the insecticidal solution being used as an adulticide and a pupicide against *Musca domestica* Linnaeus flies and *Musca domestica* Linnaeus pupa.

2. The insecticide composition of claim 1, the dioctyl sulfosuccinate being dioctyl sodium sulfosuccinate.

3. The insecticide composition of claim 1, the solution being dispensed as a spray or aerosol.

4. The insecticide composition of claim 1, the insecticide further comprising an effective amount of polysorbate-80.

* * * * *